United States Patent

Vogelei et al.

[11] 3,732,784
[45] May 15, 1973

[54] SEQUENTIALLY OPERATING LINEAR ACTUATOR

[75] Inventors: Robert A. Vogelei, Lathrup Village, Mich.; Richard W. Kirkman, Harpenden, England; Alverson B. Williams, Warren, Mich.

[73] Assignee: General Motors Corporation, Detroit, Mich.

[22] Filed: Mar. 24, 1971

[21] Appl. No.: 127,535

Related U.S. Application Data

[62] Division of Ser. No. 860,907, Sept. 25, 1969, Pat. No. 3,622,197.

[52] U.S. Cl. .......................... 92/65, 91/217, 92/117, 92/161
[51] Int. Cl. ........................... F01b 7/10, F01b 15/02
[58] Field of Search ............... 92/52, 65, 66, 117, 92/161, 146; 91/217

[56] References Cited

UNITED STATES PATENTS

| | | | |
|---|---|---|---|
| 876,758 | 1/1908 | Wolf et al. | 91/217 X |
| 2,084,216 | 6/1937 | Poage et al. | 91/217 X |
| 2,393,503 | 1/1946 | Bosomworth et al. | 91/217 X |
| 2,664,860 | 1/1954 | Levetus | 92/65 X |
| 2,792,813 | 5/1957 | Fixman et al. | 91/217 |
| 2,993,472 | 7/1961 | Einsiedler | 92/130 X |
| 3,084,920 | 4/1963 | Barrett | 92/117 |
| 3,236,620 | 2/1966 | Wiley | 92/117 X |

Primary Examiner—Irwin C. Cohen
Attorney—W. E. Finken & Herbert Furman

[57] ABSTRACT

A vehicle body closure includes a base having fore and aft pins to mate with holes in a vehicle body to locate the base in an opening in the vehicle body, a releasable top lock to secure the base to the body, and right and left flipper panels pivotally mounted thereto, with each flipper panel movable between a raised position opening half of the opening and a lowered closed position covering half of the opening. A door-controlled body-mounted sequentially-operating hydraulic linear actuator includes a spring-biased movable cylinder operably connected to a locking mechanism and a movable piston operably removably connected to a base-mounted raising mechanism through the aft pins to sequentially operate in one direction to unlock and then in the opposite direction to raise a flipper panel in response to differential fluid pressure and to operate in the one direction to lower the flipper panel and then in the opposite direction to lock it in response to opposite differential fluid pressure. The base and the flipper panels may also be removed giving a completely open body.

2 Claims, 9 Drawing Figures

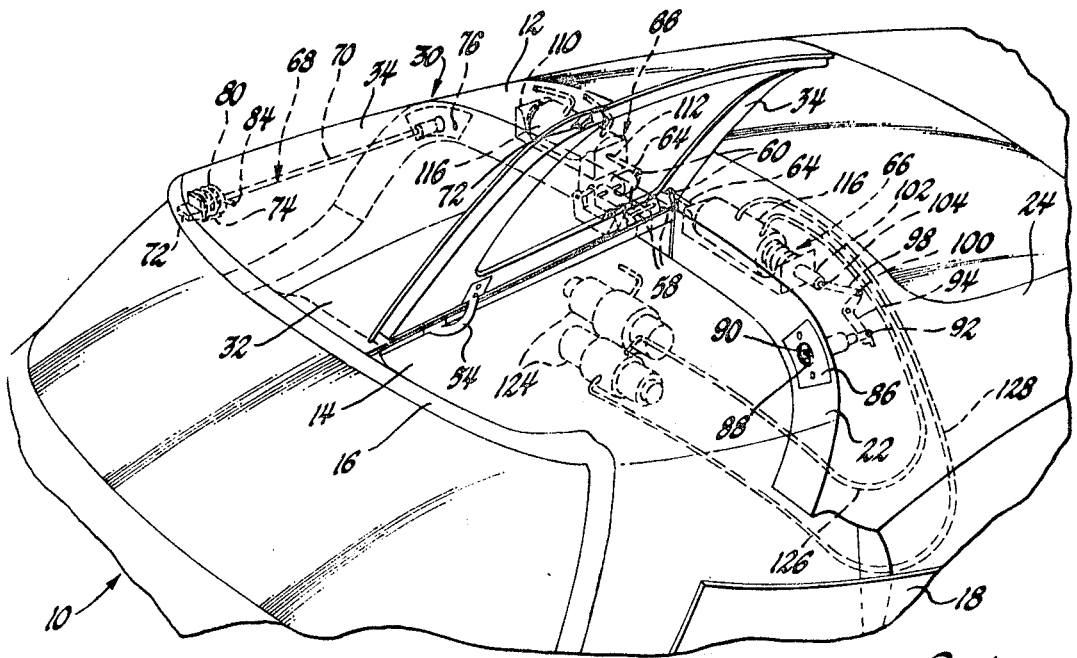
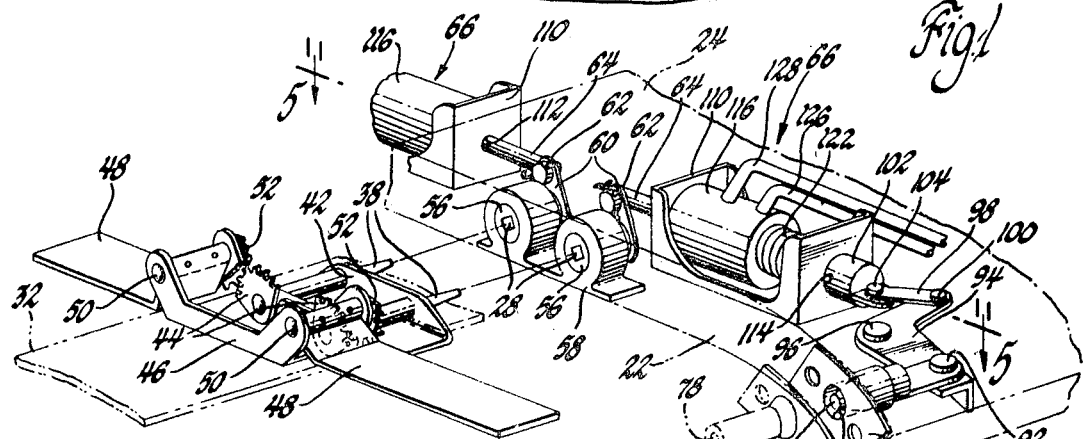
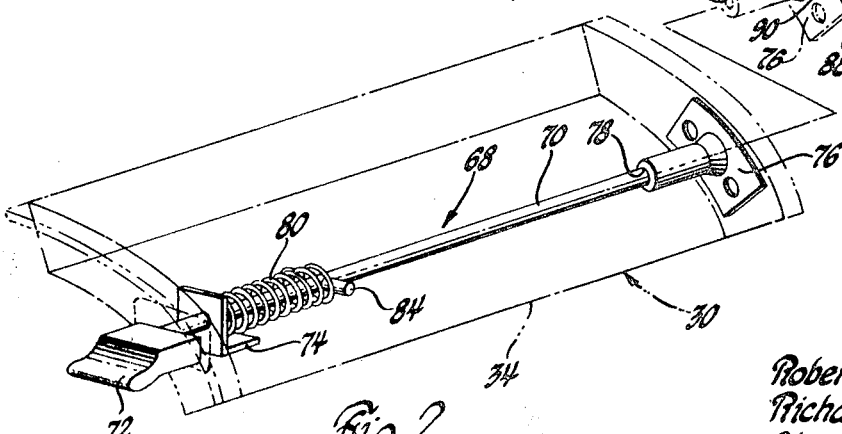
Fig.1
Fig.2
INVENTORS
Robert A. Vogelei,
Richard W. Kirkman &
BY Alverson B. Williams
Herbert Furman
ATTORNEY INVENTORS
Robert A. Vogelei,
Richard W. Kirkman &
BY Alverson B. Williams
Herbert Furman
ATTORNEY INVENTORS
Robert A. Vogelei,
Richard W. Kirkman &
BY Alverson B. Williams Herbert Freeman
ATTORNEY

SEQUENTIALLY OPERATING LINEAR ACTUATOR

This is a division of application Ser. No. 860,907, filed Sept. 25, 1969, now U.S. Pat. No. 3,622,197.

This invention relates to removable closures for vehicle body openings and more particularly to a closure which may be removed and installed as a unit and which includes flipper panels, each selectively operable by a linear actuator to open and close a portion of the opening when the closure is installed.

In a closed-body low-profile vehicle, entry and exit may be difficult due to the low roof. While entry and exit may be easier in a completely open-body low-profile vehicle because of the absence of the roof, such vehicles need a roof during times of adverse weather conditions.

The closure of this invention permits the passengers to select either a completely open-body low-profile vehicle or a closed-body low-profile vehicle which includes a closure responsive to door movement to automatically partially open and facilitate passenger entry or exit. In the preferred embodiment, the closure removably covers an opening in the roof of an open-body vehicle and includes a base pivotally mounting right and left flipper panels each of which is movable independently of the other between an open position, opening half of the roof opening, and a closed and locked position, closing half of the roof opening. The base removably mounts the closure to the body in the opening and also releasably operably connects a body-mounted door-controlled actuator to each flipper panel to move the panels between the two positions. The actuator includes a biased movable cylinder and a movable piston driven by a reversible fluid pump whose direction of operation is controlled by vehicle door position. Each actuator sequentially moves a respective panel in response to differential fluid pressure to either unlock and raise the flipper panel to the open position or in response to opposite differential fluid pressure lower the flipper panel to the closed position and lock it. The closure may also be removed to give a completely open body.

Therefore the primary object of this invention is to provide a closure which may be removed and installed as a unit and which includes flipper panels selectively operable to open and close a portion of the roof when the closure is installed. It is another object of this invention to provide such a removable closure wherein each flipper panel is sequentially unlocked and raised to an open position or lowered to a closed position and locked by the sequential operation of a door controlled fluid actuator. It is a further object of this invention to provide a linear actuator adapted to be mounted to a vehicle body and releasably operably connected to a pivotal flipper panel for moving the flipper panel sequentially between raised-open and lowered-closed and locked positions. It is another object to provide such an actuator including a movable cylinder, biased in one direction, and a movable piston to automatically sequentially operate in one direction and then in the other in response to opposite differential fluid pressure. It is yet another object of this invention to provide a removable closure with linear actuator driven movable flipper panels which are automatically disconnected from respective body mounted sequential linear actuators upon removal of the closure and which are automatically connected to the actuators upon remounting the closure.

These and other objects of this invention will become apparent from the following detailed description and drawings in which:

FIG. 1 is a perspective view of a portion of a vehicle body having an opening in the roof thereof, covered by a removable closure including movable flipper panels, according to this invention, with the right panel shown in a closed and locked position and the left panel shown in an unlocked and open position and with the operating system for the flipper panels shown in phantom lines.

FIG. 2 is a fragmented perspective view of the operating mechanisms of the closure with part of the closure and the rear roof section of the vehicle shown in phantom lines.

Figure 3:
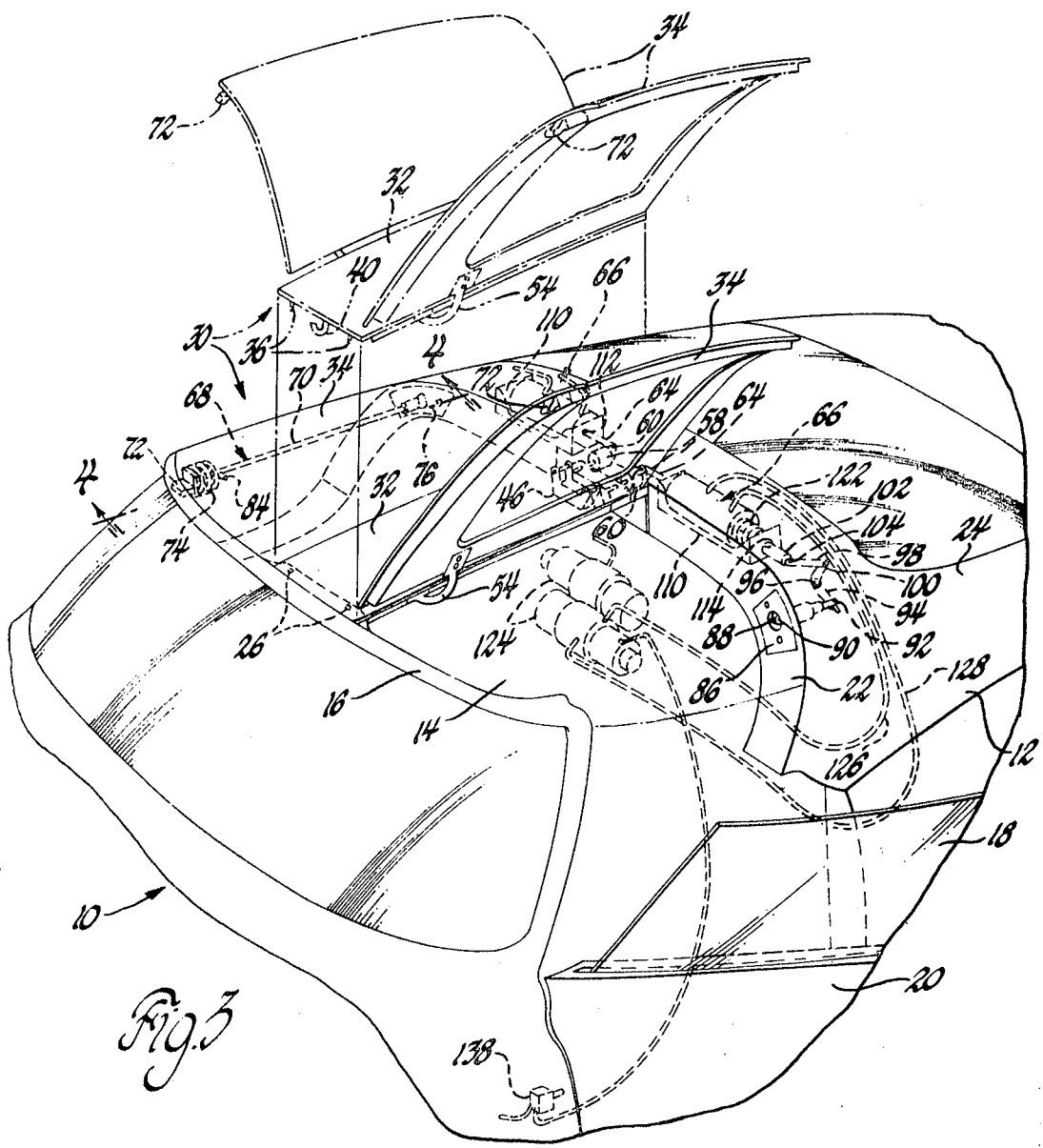
FIG. 3 is a view similar to FIG. 1 showing the removable closure mounted to the vehicle in solid lines and removed from the vehicle, with both flipper panels in open position, in phantom lines.
Figure 4:
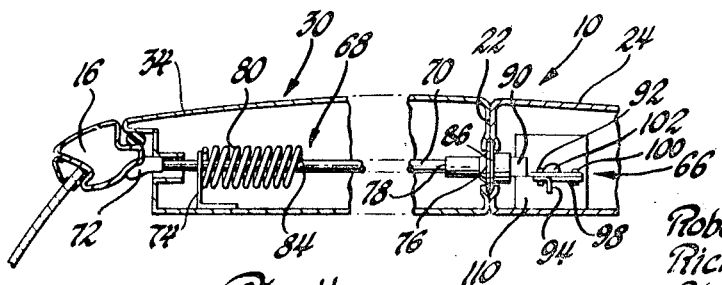
FIG. 4 is a sectional view taken along the line 4—4 of FIG. 3.

Referring now to FIGS. 1 and 3, a vehicle body 10 has a roof 12 with an opening 14 therein bounded at the front by windshield header 16, at each side by a side window 18 mounted in conventionally opening and closing doors 20, and at the rear by a forward wall 22 of the rear roof section 24. As shown in FIG. 3, the windshield header 16 has a pair of spaced vertical round-tapered holes 26 equidistant from the centerline of the vehicle body 10, and as shown in FIG. 2, the forward wall 22 has a pair of spaced horizontal square-tapered holes 28 equidistant from the centerline of the vehicle body 10.

Referring particularly to FIG. 3, the opening 14 is covered by a removable closure 30 called a flipper panel roof section which includes a base 32 for mounting transverse the opening 14 between the windshield header 16 and the forward wall 22 along the centerline of the vehicle body 10 and also includes right and left flipper panels 34 pivotally mounted to the base 32 as will later be described. The base 32 and the flipper panels 34 together in the closed position cover the opening 14 and conventionally sealingly engage the windshield header 16, the windows 18 and the forward wall 22 of the rear roof section 24 to seal the interior of the vehicle body 10. As shown, the right and left flipper panels 34 are identical except for being mirror images of each other and as such only one flipper panel will be described in detail. The flipper panel roof section is shown with two flipper panels but it could have any number including only one.

As seen in FIG. 3, base 32 has at its front edge a pair of spaced downwardly extending round tapered pins 36 equidistant from the base 32 centerline and, as seen in FIG. 2, the base 32 has at its rear edge a pair of spaced rearwardly extending square tapered pins 38 equal distant from the base 32 centerline. The tapered pins 36 and 38 mate with the tapered holes 26 and 28 respectively to locate the base 32 centerline on the vehicle body 10 centerline and attach the base 32 to the body 10. On the front underside of the base 32 is mounted a conventional convertible top latch 40 for securing the base 32 to the vehicle body 10 by engaging the underside of the windshield header 16 after the base 32 has been positioned by the pins 36 and 38.

The closure 30 is manually mounted to the body 10 over the opening 14 by initially positioning the closure 30 above the opening 14 and slightly forward of its final position with the centerline of the base 32 on the centerline of the vehicle body 10 to line up the pins 36 and 38 with the holes 26 and 28. The rear edge of the base 32 is lowered slightly, starting the square tapered pins 38 into the square tapered holes 28 and the base 32 is moved rearwardly. When the base 32 is directly over the opening 14, the front edge is lowered, sliding pins 36 into tapered holes 26 to laterally locate the closure 30. The top latch 40 is then manually locked, securing the base 32 to the windshield header 16 to complete the mounting of the closure 30 to the vehicle body 10 over the opening 14.

To remove the closure 30 once both of the flipper panels 34 have been unlocked and raised as will be later explained, the top latch 40 is manually unlocked and the front edge of the base 32 is raised to move pins 36 from holes 26. The base 32 is then slid forward to slide the pins 38 from holes 28. The closure 30 is then completely free of the vehicle body 10 and the vehicle body 10 has an open top.

The square tapered pins 38, besides locating the rear of the base 32, also drivingly connect the closure 30 to the drive mechanism mounted in the rear roof section 24. The drive mechanism is the same for each panel 34 so that only one will be described. As seen in FIG. 2, pin 38 has a cylindrical portion, forward of the square tapered portion, which is rotatably mounted in aligned holes through the walls of a channel bracket 42 mounted within the base 32 adjacent the rear edge thereof. The forward end of pin 38 fixedly mounts a sector gear 44 so that rotation of pin 38 rotates the sector gear 44.

Mounted in the base 32 adjacent the channel bracket 42 is another channel bracket 46 with both ends thereof having the webbing relieved. Each end of bracket 42 has an aligned pair of holes through the walls thereof. Between the walls of the channel bracket 46 at each end thereof is positioned the looped end of a hinge strap 48. A pin 50 having a sector gear 52 on the aft end thereof is passed through the rear hole of the aligned holes, through a looped end of the strap 48 and through the forward hole of the aligned holes to pivotally mount the strap 48 to the base 32. The pin 50 is so positioned that the teeth of the sector gear 52 mesh with the teeth of the sector gear 44 for a driving interconnection therebetween. The strap 48 is nonrotatably attached to the pin 50 by any conventional method such as by pins.

The hinge strap 48 is attached to the rear inboard portion of the flipper panel 34 by conventional means such as bolts to drivingly pivotally attach the flipper panel 34 to the base 32. The front inboard portion of the flipper panel 34 is pivotally mounted to the base portion 32 by a conventional strap hinge 54. The flipper panel 34 pivots on hinges 54 and 48 to move, in response to rotation of the square tapered pin 38, between a closed position, shown in FIG. 1 by the right panel, covering the opening 14, and an open position, shown in FIG. 1 by the left panel, opening the opening 14. The hinges 54 and 48 in the open position of the panel 34 engage the base 32 to prevent further opening movement.

As was previously described, the square tapered pin 38 mates with the square tapered hole 28 in the roof rear section 24 to provide for lateral location of the base 32. However, this mating does more than locate the base 32 as it also provides a driving connection between the base 32 and the mechanism in the vehicle body 10 for raising and lowering the roof flipper panel 34.

As seen in FIG. 2, the square tapered hole 28 is in the forward end of a shaft 56. A pair of shafts 56, are both rotatably mounted in suitable spaced relationship by housing 58 in the rear roof section 24. The rear end of shaft 56 has a crank 60 non-rotatably attached thereto. The crank has an opening 62 in its upper end through which is inserted and secured by a cotter pin to the hooked end of a piston rod 64. The piston rod 64 is moved back and forth by linear actuator 66 which will be later described. As the piston rod 64 reciprocates, the crank 60 rotates shaft 56 in the housing 58 to drive the flipper panel 34 between a raised-open position and a lowered-closed position.

As shown in FIG. 2, the flipper panel 34 contains, adjacent its outboard edge, part of a locking mechanism 68 for releasably securing the outboard edge of the panel 34 to the vehicle body 10. The locking mechanism 68 releasably secures the forward wall of the flipper panel 34 to the windshield header 16 and the rearward wall of the flipper panel 34 to the forward wall 22 of the rear roof section 24. The flipper panel mounted part of the locking mechanism includes a rod 70 with a bolt 72 on the fore end thereof. The rod 70 is slidably mounted to the flipper panel 34 for fore and aft movement by an apertured forward angle bracket 74 and a rear bracket 76 with a cylindrical opening 78. The brackets 74 and 76 are so positioned on the flipper panel 34 that when the flipper panel 34 is closed, the bolt 72 will extend under the windshield header 16 as the rod 70 is moved forward to lock the flipper panel 34 thereto. The bracket 74 is also so positioned adjacent the front and outboard walls of the flipper panel 34 that the bolt 72 engages the bracket 74 to limit rearward movement of the rod 70 just as the bolt 72 has ceased to protrude beyond the forward wall of the flipper panel 34. The rear bracket 76 mounts on the rear wall of the flipper panel 34 adjacent the outboard end thereof and is of sufficient length to enable the rod 70 to slide fore and aft without the rear end thereof dropping out of the opening 78. The rod 70 and bolt 72 in the rear or unlocked position are flush with the forward and rearward walls of the flipper panel 34.

The rod 70 is biased rearwardly to the unlocked position by a coil spring 80 therearound with the fore end of the spring seating against angle bracket 74 and the aft end thereof seating against a pin 84 through a hole in the rod 70.

The locking mechanism 68 is completed by the part thereof mounted in the rear roof section 24. Brackets 86 are mounted to the forward wall 22 adjacent the position of each of the rear brackets 76 on the flipper panel 34 in closed position. The bracket 86 contains a tubular hole 88 aligned with the cylindrical opening 78 of the rear bracket 76 in the closed position of the flipper panel 34 for slidably receiving and supporting a locking pin 90. The locking pin 90 is tapered on its fore end and is pivotally attached through its apertured rear end by a pin 92 to one leg of a bellcrank lever 94 pivoted at 96 to the rear roof section 24. The other leg of lever 94 is connected to an apertured end of link 98 by pin 100. The apertured other end of link 98 is connected to the apertured outboard end of a cylinder rod 102 of the linear actuator 66 by a pin 104.

As the cylinder rod 102 is moved back and forth, as will later be described, the link 98 pivots the bellcrank lever 94 to move the locking pin 90 between an unlocked position wherein the locking pin 90 is flush with the forward wall 22 of the rear roof section 24 and a locked position wherein the locking pin 90 protrudes forwardly from the forward wall 22 of the rear roof section 24.

The locking of the closed flipper panel 34 occurs by the locking pin 90 sliding forward from the tubular hole 88 of the bracket 86 into the cylindrical opening 78 in the bracket 76 aligned therewith to secure the rear edge of the flipper panel 34 to the rear roof section 24. As the locking pin 90 slides forward, it engages the rear end of the rod 70 to drive rod 70 forward and slide bolt 72 under the windshield header 16 to secure the forward edge of the flipper panel 34.

Unlocking of the closed flipper panel 34 occurs by the locking pin 90 sliding rearward to the unlocked position in the tubular hole 88 in the bracket 86, flush with the forward wall 22 to free the rear edge of flipper panel 34. The spring 80 simultaneously drives the rod 70 rearwardly to the unlocked position wherein the bolt 72 no longer engages the windshield header 16, freeing the forward edge of the flipper panel 34 from the vehicle body 10.

The flipper panel 34 has an open and closed position and while in the closed position is either locked or unlocked from the vehicle body 10. The two terminal positions of the panel 34 are open or closed and locked. In moving between these terminal positions, the proper sequency must be followed. From the closed and locked position, the flipper panel 34 must be unlocked and then raised to the open position where the hinges 48 and 54 engage the base 32. From the open position, the flipper panel 34 must be lowered to the closed position, where it engages the windshield header 16, and then locked. The proper sequence of operations for each flipper panel 34 must come from its respective linear actuator 66.

The linear actuator 66 for each flipper panel 34, shown in FIG. 2 and schematically illustrated in FIGS. 5, 6, 7, and 8, includes a box-shaped housing 110 conventionally secured laterally of the vehicle body 10 within the rear roof section 24. The box-shaped housing 110 has both sides and the top cut out to provide access to the interior thereof. The box-shaped housing 110 has an opening 112 in the inboard end, or right end in FIGS. 5–8, and an opening 114 in the outboard end, or left end in FIGS. 5–8.

A hollow-closed cylinder 116 of a length less than the space between the ends of the housing 110 has the cylinder rod 102 protruding out of the outboard or left end thereof and has an opening 118 in the inboard or right end thereof to a cylindrical cavity therein. A piston 120 is slidably mounted within the cavity of the cylinder 116 for reciprocal movement therealong and has the piston rod 64 extending therefrom out through opening 118. The juncture between the piston rod 64 and the cylinder 116 is conventionally sealed to prevent the loss of fluid through opening 118. The cylinder 116 and piston 120 combination is mounted within the housing 110 by inserting the retracted cylinder 116 and piston 120 therein and extending the piston rod 64 through the opening 112 and extending the cylinder rod 102 through opening 114. As the cylinder 116 is shorter in length than the distance between the ends of the housing 110, the cylinder 116 is free to reciprocate therebetween with the ends of the housing 110 limiting this movement.

The cylinder 116 has a circular groove therein around the cylinder rod 102 for receiving a coil spring. A coil spring 122 is slid over the cylinder rod 102 with one end of the spring 122 seating against the cylinder 116 in the groove. The spring 122 is compressed and inserted into the housing 110 with the cylinder 116. The compression is then released allowing the other end of the spring 122 to seat against the inside of the outboard or left end of the housing 110 to bias the cylinder 116 against the inside of the inboard or right end of the housing 110.

After the cylinder 116 and piston 120 have been mounted in the housing 110, the piston rod 64 is hooked to the crank 60 and the cylinder rod 102 is attached to link 98 by pivot pin 104 as previously described. The dimensions of the cylinder 116 and piston 120 and cylinder and piston rods 64 and 102 are such that when the flipper panel 34 is unlocked and opened, the cylinder and piston rods 102 and 64 are retracted with the cylinder 116 against the inboard or right end of the housing 116 and when the flipper panel 34 is lowered and locked, the cylinder and piston rods are extended, with the cylinder 116 tightly compressing spring 122 against the outboard or left end of the housing 110.

Each linear actuator 66 is powered by a reversible fluid pump 124 which supplies fluid through flexible tubes 126 and 128 to passages 130 and 132 through the walls of the cylinder 116. The passage 130 enters the cylindrical cavity at the outboard or left end and the passage 132 enters the cylinder cavity at the inboard or right end for alternatively supplying or exhausting fluid to either side of piston 120 to provide a differential fluid pressure on the piston 120 and cylinder 116. The fluid pump 124, the tubes 126 and 128, passages 130 and 132 and the cavity of cylinder 116 together form a closed fluid system supplied on demand with fluid, from a conventional fluid reservoir system 134, shown schematically in FIG. 9.

Figure 9:
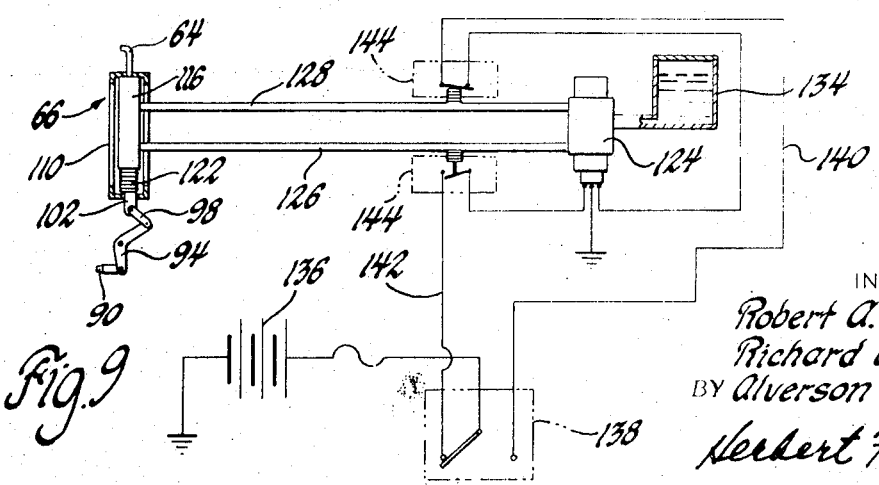
FIG. 9 is a schematic of the actuator, fluid pump, and electrical system used to control the operation of a fluid pump supplying fluid to the linear actuator.

Each pump 124 is driven by a reversible electric motor, incorportated therein, across a source of power such as battery and generator system 136. As shown in FIG. 9, the battery and generator system 136 is connected to a single pole double throw switch 138 in an opening circuit 140 and a closing circuit 142. Each circuit 140 and 142 has conventional fluid pressure limit switches 144 in the respective tubes 126 and 128 to limit the operation of the motor and pump 124. The switch 138 is mounted to the vehicle body 10 so that it energizes circuit 140 as the respective door 20 is opened and energizes circuit 142 as the door 20 is closed.

Figure 5:
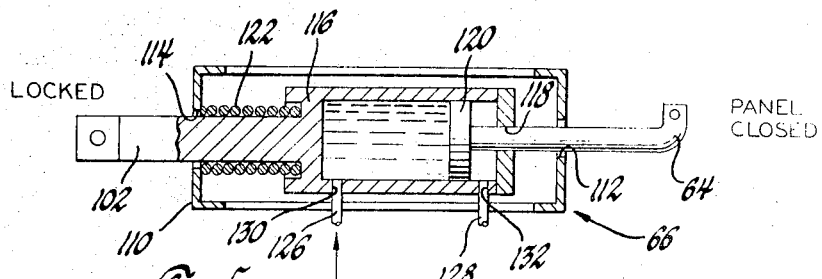
FIG. 5 is a sectional schematic view of the linear actuator for operating a flipper panel taken along the line 5—5 of FIG. 2 showing the linear actuator when the flipper panel is in the closed and locked position.

When the closure 30 is mounted over opening 14, the operation of the flipper panel 34 is automatic as far as the passenger is concerned. As the passenger opens the door 20, the switch 138 energizes the opening circuit 140 to operate the fluid pump 124 in one direction. As shown in FIG. 5, when the fluid actuator is in the position corresponding to flipper panel 34 being closed and locked and maintained there by trapped fluid within the cavity of cylinder 116, the operation of the fluid pump 124 in the one direction releases the trapped fluid. The released fluid exhausts the cavity through opening 130 and tube 126 and allows the spring 122 to drive the cylinder 116 to the right or inboard of the vehicle body 10 from the position shown in FIG. 5 to the position shown in FIG. 6 against the inboard or right end of housing 110. The movement of the cylinder 116 and the cylinder rod 102 to the right pulls on link 98 pivoting L-shaped member 94 and sliding locking pin 90 aft of the vehicle body 10 to the unlocked position, unlocking the flipper panel 34 as previously described.

Figure 6:
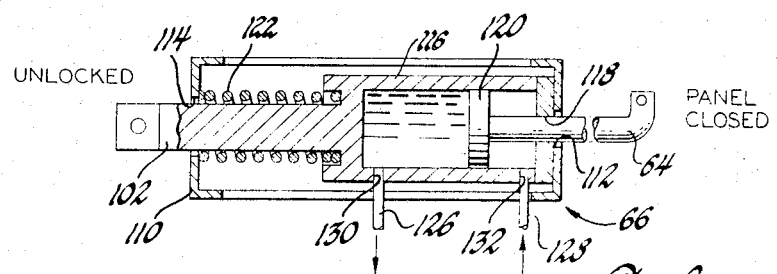
FIG. 6 is a view similar to FIG. 5 showing the linear actuator when the flipper panel is in the closed and unlocked position.
Figure 7:
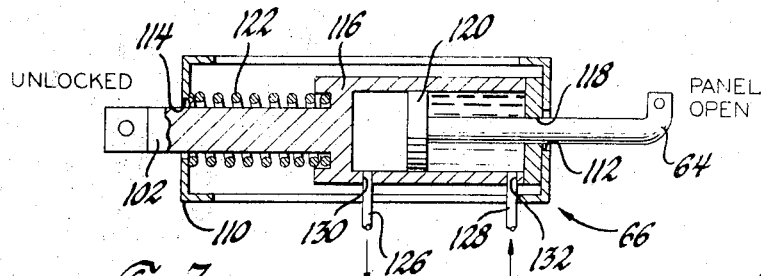
FIG. 7 is a view similar to FIG. 5 showing the linear actuator when the flipper panel is in the unlocked and open position.

With the flipper panel 34 unlocked, continued operation of the fluid motor 124 in the one direction supplies fluid through tube 128 and passage 132 to the cavity on the right or inboard side of the piston 120 to drive the piston 120 to the left or outboard of the vehicle from the position shown in FIG. 6 to the position shown in FIG. 7. Movement of the piston 120 and the piston rod 64 to the left or outboard rotates crank 60, shaft 56, square tapered pin 38 and gear section 44 in one direction to rotate gear section 52, hinge strap 48, and flipper panel 34 in the opposite direction, raising the flipper panel 34 to open position. When the flipper panel reaches the open position, the piston 120 is limited from moving to the left any further so that the continued supplying of fluid in the one direction, by the fluid pump 124, raises the differential fluid pressure until the respective limit switch 144 shuts off the pump 124. The flipper pane' 34 is now fully opened for passenger entry or exit and is maintained in the open position by the differential fluid pressure in the cylinder 116 against the right side of piston 120.

As the passenger closes the door 20, the switch 138 energizes the closing circuit 142 to operate the fluid pump in the opposite direction supplying fluid through tube 126 and passage 130 to the cylinder cavity on the left or outboard side of piston 120. The fluid on the left side of piston 120 drives the fluid on the right side of piston 120 through passage 132 and tube 128 while moving the piston to the right or inboard from the position in FIG. 7 to the position in FIG. 8. The cylinder 116 will not move to the left because of the spring 122. The movement of the piston 120 and the piston rod 64 to the right or inboard rotates crank 60, shaft 56, square tapered pin 38 and gear section 44 in the opposite direction to rotate gear section 52, hinge strap 48 and flipper panel 34 in the one direction, lowering the flipper panel 34 to the closed position. Notice in FIG. 8 that the flipper panel 34 has reached the closed position and is limited from further downward movement by its engagement with the windshield header 16, while the piston 120 still has travel to the right remaining in the cylinder cavity.

Figure 8:
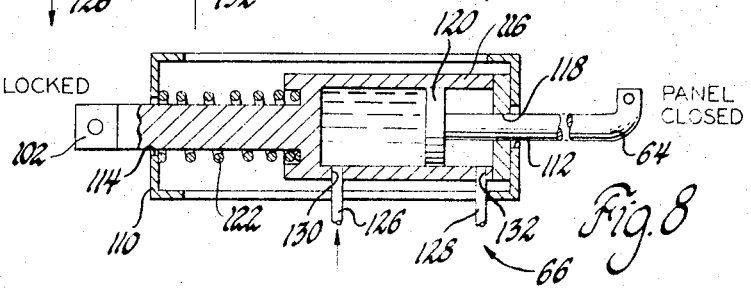
FIG. 8 is a view similar to FIG. 5 showing the linear actuator when the flipper panel is in the closed and unlocked position.

With the flipper panel 34 closed, continued operation of the fluid pump 124 in the opposite direction continues to supply fluid to the left side of the piston 120 but the piston is restrained from moving to the right by the flipper panel 34 engaging the windshield header 16 so that the fluid now moves the cylinder 116 to the left or outboard against the biasing of spring 122 from the position shown in FIG. 8 to the position shown in FIG. 5. The movement of the cylinder 116 and the cylinder rod 102 to the left or outboard pushes link 98, pivoting bellcrank 94 and sliding locking pin 90 forward on the vehicle body 10 into cylindrical opening 76 driving rod 70 and bolt 72 under the windshield header 16 to lock the flipper panel 34 to the vehicle body as previously described. Once the cylinder 116 has completely compressed spring 122 against the end of the housing 110, it can move no further left or outboard so that the continued supply of fluid by the fluid pump 124 in the opposite direction raises the differential fluid pressure until limit switch 144 shuts off the fluid pump 124. The flipper panel 34 is now closed and locked where it will be maintained by the differential fluid pressure in the cylinder cavity acting against the left or outboard end of the piston 120 until the door 20 is again opened to repeat the sequence.

The flipper panel 34 is maintained in either the open position or the lowered and locked position by differential fluid pressure within the cylindrical cavity. As a practical matter, this differential fluid pressure will drop as a result of fluid leakage over a period of time. However, with the respective limit switches 144 breaking an otherwise closed circuit in response to high fluid pressure, when the fluid pressure drops significantly, the limit switch 144 will close the circuit to operate the fluid pump 124 in the correct direction to restore the pressure to the proper level. Thus the differential fluid pressure maintaining the flipper panel 34 in a terminal position is automatically kept sufficiently high by the limit switch 144.

To remove the flipper panel roof section completely, both doors 20 must be opened. The opening of both doors 20 unlocks and opens both flipper panels 34 as previously described. Once both flipper panels 34 are opened, the flipper panel roof section 30 is removed by unlatching top latch 40 and lifting the flipper panel roof section 30 away as previously described.

In remounting the closure 30, both doors 20 must be opened and the flipper panels 34 also must be in the open position, to obtain correspondence between the positions of the square tapered holes 28 and the square tapered pins 38. The closure 30 is remounted as previously described and the top latch 40 is latched before the doors 20 are closed to close the flipper panels 34.

In this embodiment, fluid pressure was used to move the piston and cylinder but fluid vacuum could be used as an alternative and in such case the tubes 126 and 128 would have to be reversed but the piston and cylinder would operate the same.

In this embodiment, the cylinder drove the locking mechanism and the piston drove the flipper panel. However, by reversing the locations of the piston and cylinder and biasing the piston rather than the cylinder, the same sequential operation could be obtained.

It is also possible to add linkages to the raising mechanism and the locking mechanism so that extending the piston and cylinder would unlock and raise the flipper panel and retracting the piston and cylinder would lower the flipper panel and lock it. In such case the cylinder would have to be biased to the extended position for the actuator to have the proper sequence of movements.

It is also possible to obtain a sequential arcuate motion directly by using a pivoted cylinder with an arcuate cylindrical cavity and a mating piston with an arcuate piston rod.

Many other combinations of the above possibilities can obviously be devised by a skilled artisan in light of this specification and such combinations are covered by the following claims.

Thus the removable closure for a vehicle body of this invention pivotally mounts flipper panels driven between an open position opening the vehicle body and a closed and locked position closing the vehicle body by sequentially operating a linear actuator.

What is claimed is:

1. A sequentially operating linear actuator comprising, a housing including first and second stop portions spaced from each other in opposed relationship, a cylinder received by the housing and movable between the first and second stop portions, the cylinder including a rigid connecting portion which extends outwardly of the housing beyond the first stop portion for attachment to a first mechanism which limits outward movement of this connecting portion relative to the housing and is actuated by inward movement thereof, a piston received by the cylinder for reciprocal movement relative thereto, the piston including a rigid connecting portion extending through the cylinder and outwardly of the housing beyond the second stop portion for attachment to a second different mechanism which limits outward movement of this connecting portion relative to the housing and is actuated by inward movement thereof, resilient means interposed between said first stop portion and said cylinder for normally biasing the cylinder into engagement with the second stop portion so as to pull the connecting portion of the cylinder inward and actuate the first mechanism, and means for supplying a differential fluid pressure to the opposite sides of the piston so as to maintain the connecting portions of the cylinder and piston in an extended relationship relative to each other with the cylinder held out of engagement with the second stop portion against the action of the biasing means and with the first and second mechanisms maintained in unactuated conditions, the supply means being adaptable to reverse the direction of the differential fluid pressure supplied to the opposite sides of the piston so as to allow the biasing means to initially move the cylinder into engagement with the second stop portion and concomitantly actuate the first mechanism and to then move the piston and pull its connecting portion inward to actuate the second mechanism.

2. A sequentially operating linear actuator actuator comprising, a housing including first and second end walls spaced from each other in opposed relationship, a cylinder received by the housing and movable between the end walls thereof, the cylinder including a rigid connecting portion which extends outwardly of the housing beyond the first end wall for attachment to a first mechanism which limits outward movement of this connecting portion relative to the housing and is actuated by inward movement thereof, a piston received by the cylinder for reciprocal movement relative thereto, the piston including a rigid connecting portion extending through the cylinder and outwardly of the housing beyond the second end wall for attachment to a second different mechanism which limits outward movement of this connecting portion relative to the housing and is actuated by inward movement thereof, a helical spring encircling the connecting portion of the cylinder with its opposite ends seated against the first end wall of the housing and against the adjacent end of the cylinder, the helical spring normally biasing the cylinder into engagement with the second end wall of the housing so as to pull the connecting portion of the cylinder inward and actuate the first mechanism, means for supplying a differential fluid pressure to the opposite sides of the piston so as to maintain the connecting portions of the cylinder and piston in an extended relationship relative to each other with the cylinder held out of engagement with the second end wall against the bias of the spring and with the first and second mechanisms maintained in unactuated conditions, and means for reversing the direction of the differential fluid pressure supplied to the opposite sides of the piston so as to allow the spring to initially move the cylinder into engagement with the second end wall and concomitantly actuate the first mechanism and to then move the piston and pull its connecting portion inward to actuate the second mechanism, a reversal of the direction of supplied differential fluid pressure with the first and second mechanisms actuated initially causing the piston to move its connecting portion outward and deactuate the second mechanism and to then move the cylinder against the bias of the spring so as to move the connecting portion of the cylinder outward and to deactuate the first mechanism.

* * * * *